(12) United States Patent
Lozben

(10) Patent No.: US 7,594,218 B1
(45) Date of Patent: Sep. 22, 2009

(54) SYSTEM AND METHOD FOR PROVIDING AUDIO IN A MEDIA FILE

(75) Inventor: Slavik Lozben, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1518 days.

(21) Appl. No.: 10/201,056

(22) Filed: Jul. 23, 2002

Related U.S. Application Data

(60) Provisional application No. 60/307,678, filed on Jul. 24, 2001.

(51) Int. Cl.
- G06F 9/44 (2006.01)
- G06F 17/00 (2006.01)
- G06F 11/30 (2006.01)

(52) U.S. Cl. ............ 717/120; 717/105; 717/113; 717/125; 715/203; 715/210; 713/190

(58) Field of Classification Search .......... None
See application file for complete search history.

(56) References Cited

U.S. PATENT DOCUMENTS

| | | | |
|---|---|---|---|
| 5,579,430 A | | 11/1996 | Grill et al. |
| 5,742,735 A | | 4/1998 | Eberlein et al. |
| 5,903,892 A | * | 5/1999 | Hoffert et al. ............. 707/10 |
| 6,489,969 B1 | * | 12/2002 | Garmon et al. ............ 715/723 |
| 6,839,059 B1 | * | 1/2005 | Anderson et al. .......... 345/501 |
| 7,069,310 B1 | * | 6/2006 | Bartholomew ............. 709/219 |
| 2002/0069218 A1 | * | 6/2002 | Sull et al. ................ 707/501.1 |
| 2003/0001904 A1 | * | 1/2003 | Rosen et al. .............. 345/848 |
| 2007/0168426 A1 | * | 7/2007 | Ludwig et al. ............ 709/204 |

OTHER PUBLICATIONS

Ulrich "Macromedia Flash for Windows & Macintosh", Peachpit Press, ISBN 0-201-71614-3, 2001.

* cited by examiner

*Primary Examiner*—Chuck O Kendall
(74) *Attorney, Agent, or Firm*—Fish & Richardson P.C.

(57) ABSTRACT

A system and method adds audio to a media file. The audio may be received via one or more files in an uncompressed format, a compressed format or both types of files may be received. The system and method can mix multiple sources, and converts the audio received into a compressed version in a manner that facilitates streaming.

27 Claims, 4 Drawing Sheets

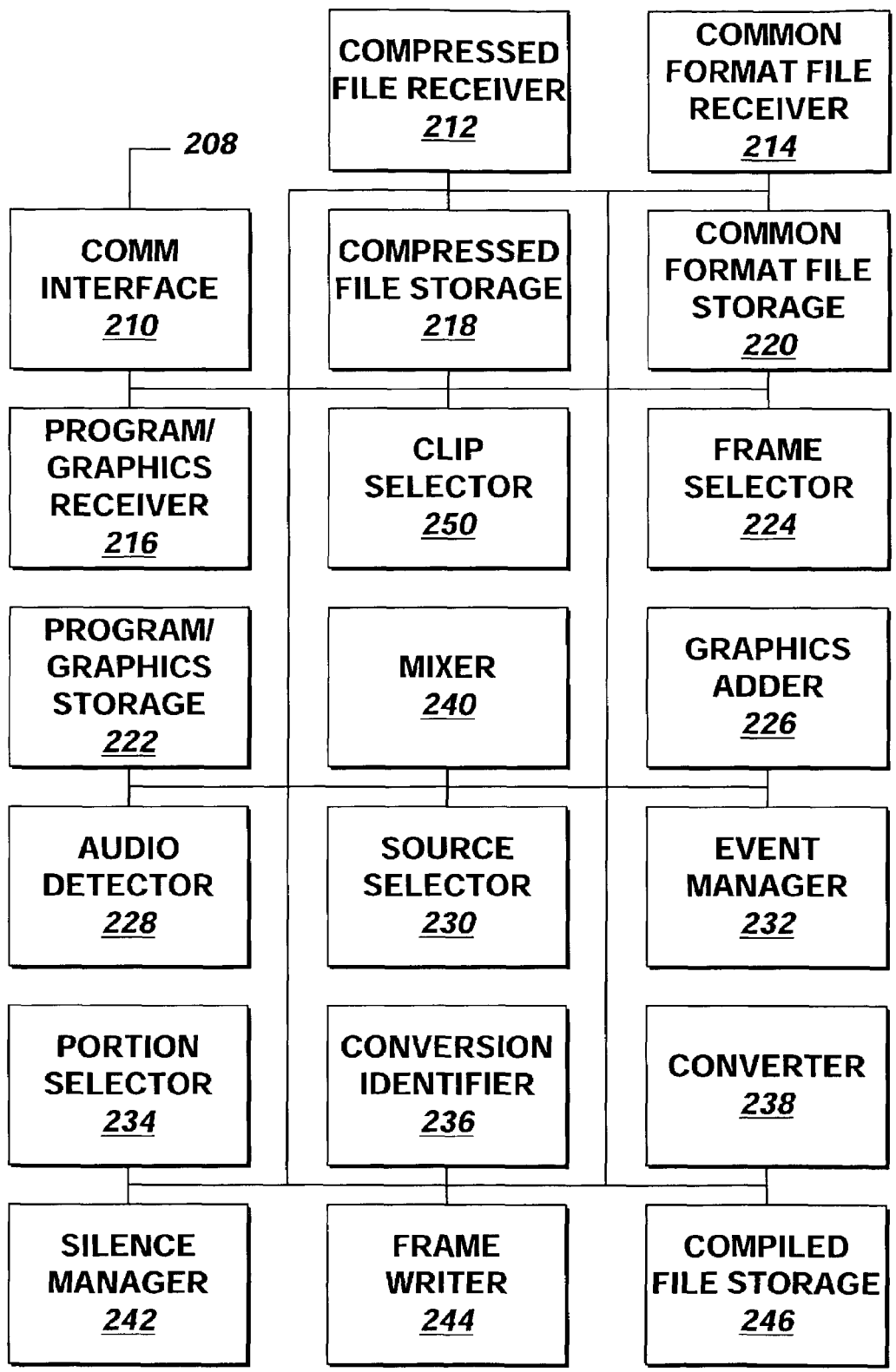

SYSTEM AND METHOD FOR PROVIDING AUDIO IN A MEDIA FILE

RELATED APPLICATION

This application claims the benefit of U.S. provisional patent application Ser. No. 60/307,678 entitled "Method And Apparatus For Providing Audio In A Media File" filed on Jul. 24, 2001 by Slavik Lozben and is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software for audio storage.

BACKGROUND OF THE INVENTION

A media file is used to communicate media information such as graphics or audio either remotely, such as over the Internet, or locally, from a disk drive coupled to a computer system directly or via a local area network. Media files may contain graphics, audio or both as well as information concerning the graphics or audio.

Some media files are capable of communicating graphics as an animated sequence of frames and may include audio as an integrated part of the frames or as a separate file. The conventional .swf file format built using the conventional Flash 5 authoring tool commercially available from Macromedia, Inc. of San Francisco, Calif. is one type of media file that can communicate graphics or audio using multiple frames. Static graphics are placed in each frame and a player such as the conventional Flash 5 player is used to replay the frames. Although the graphics within each frame are static, the player displays each of a sequence of frames for a very short duration defined by the author of the movie, such as approximately 1/12, 1/15 or 1/20 of a second long, so that the sequence appears animated, much like a motion picture is a series of static images contained in frames. An audio portion may be contained within the data structure for each frame of a Flash 5 media file. The audio portion may contain audio to be rendered during playback of the media file.

To build a media file such as a Flash 5 media file, a user uses an authoring tool such as the conventional Flash 5 authoring tool commercially available from Macromedia, Inc. of San Francisco, Calif. The authoring tool takes source images, audio sources and instructions from an author and compiles them into the frames of a swf file according to one or more instructions it receives. If there is more than one source of audio for a frame, the audio from the sources designated for the frame is mixed prior to placing it into the frame to reduce the size of the resulting media file. Because many media files are downloaded from the Internet or otherwise transmitted over a network, limiting the size of the file can decrease the time it takes to download a media file.

There are several file formats in common use. Compressed file formats such as the conventional MP3 file format use a smaller number of bits to represent audio than other non-compressed file formats. Thus, the use of compressed file formats can ensure the audio in a media file is kept to a small size.

Common format file formats such as the conventional WAV file format are not compressed. Common format files utilize a set number of bits per unit of time, and so it is easier to mix together audio files in common file formats than it is to mix audio files in compressed file formats, because the compression of compressed file formats can mean that different portions of the compressed audio file may use a different number of bits per unit of time. Thus, conventional authoring tools such as Flash 4, the predecessor to Flash 5, have required that users provide all source files to be compiled into a .swf media file in a common file format such as WAV so that if multiple sources of audio are to be used in the media file, they may be mixed, and the resulting mixed common format audio file is compressed into a compressed file format prior to placing the mixed audio into the .swf file.

There are several problems with this approach. Compressed format files are widespread, and so there is much available source material in compressed file formats. If the author wishes to use such compressed format source material, because conventional authoring tools such as the Flash 4 player that preceded the Flash 5 player did not accept files from both common and compressed formats, the author was first required to go through a time consuming and inconvenient process of conversion from a compressed format to a common format. Furthermore, if the author only has one source to be added to a media file, the author was required to convert the compressed file to a common format, allowing for the introduction of loss that may be inherent in the file conversion, only to have the file converted back into the original compressed file format by the authoring tool during which compilation of the .swf file, with the potential for additional loss.

What is needed is a method and system that can create media files from common and compressed file formats and does not require conversion for single sources of audio files received in the same format as is used in the media file.

SUMMARY OF INVENTION

A system and method receives one or more source audio files and builds a media file containing information from the one or more audio source files. The audio source files may be received in a common file format, compressed file format or different files may be received in different file formats. Any compressed files are converted to a common file format such as WAV if at least one audio source file is received for simultaneous playback with another audio source file for at least a part of the playback time, the resulting common format files mixed, and a portion at a time of the resulting mixed common file format is selected, converted into a compressed file format and included in a media file, with the playback time of each portion selected approximately equal to the length of time any graphics in a frame of the media file will be displayed, or equal to a different length. If one file is received as an audio source file for playback by itself, if it is in a compressed file format, it may be converted from compressed format to common format and converted into a compressed file format a portion at a time and included in media file as described above, or left in compressed format and inserted into the media file a portion at a time. The system and method may detect silence that would otherwise be inserted into the media file, and further compress it.

BRIEF DESCRIPTION OF THE DRAWINGS

FIG. 2 is a block schematic diagram of a system for providing audio to a media file according to one embodiment of the present invention.

DETAILED DESCRIPTION OF A PREFERRED EMBODIMENT

Figure 1:
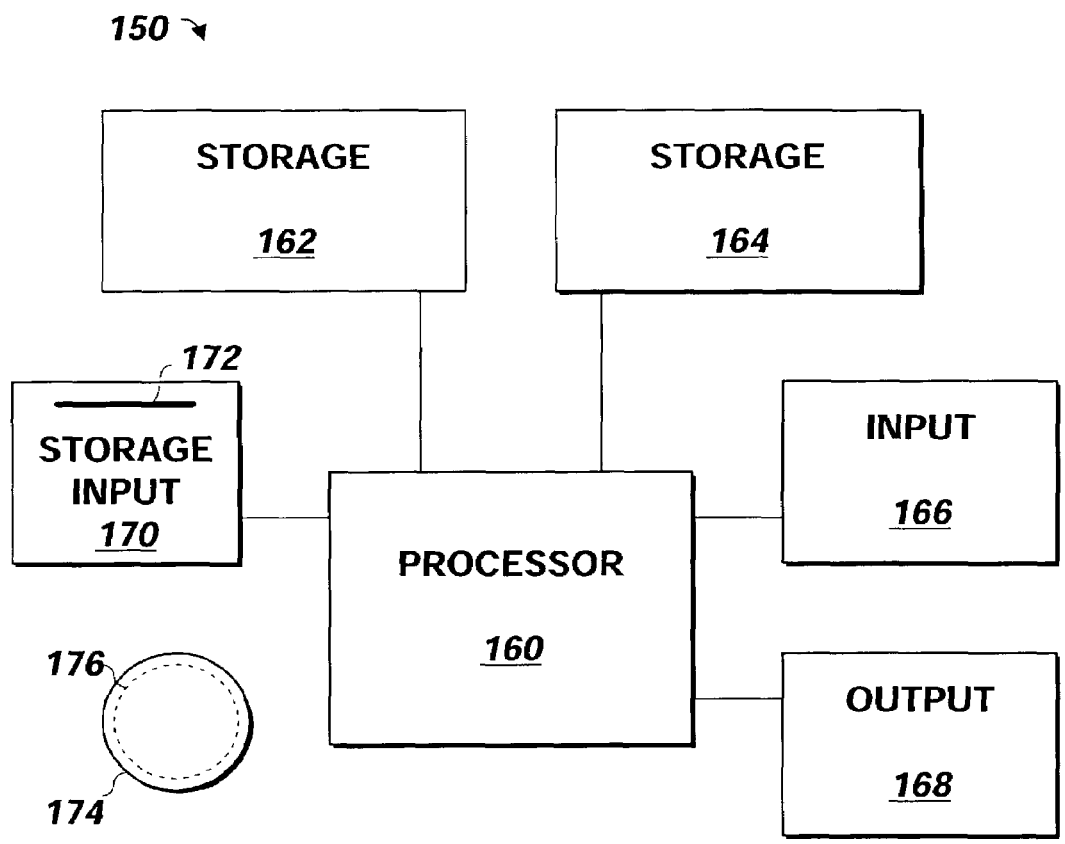
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or a Macintosh computer system running the MacOS, OS X, or OpenStep operating system commercially available from Apple Computer Corporation of Cupertino, Calif. and the Netscape browser commercially available from Netscape Computer Corporation of Mountain View, Calif. although other systems may be used.

Referring now to FIG. 2, a system for adding audio to a media file is shown according to one embodiment of the present invention. In one embodiment, the media file is defined by an author in an authoring file and compiled in a form that may be served to a user, for example over an Internet connection, and then converted into a form that may be perceived by a user, such as via a conventional audio interface card inserted into a conventional personal computer.

In one embodiment, the media file is provided in the form of a movie, such as a Flash movie capable of playback by the conventional Flash 5 Player plug in to browsers such as Internet Explorer or Navigator, all described above. The format of the Flash 5 movie is described at http://www.macromedia-.com/software/flash/open/licensing/fil eformat/, which is hereby incorporated by reference in its entirety.

In one embodiment a movie contains one or more movie clips and instructions regarding how to render the movie clips. A movie clip is a sequence of frames defined by the author of the movie. Movie clips may be thought of as a section of a movie. Movie clips may be nested so that a movie clip could be built from two distinct movie clips.

Each movie clip contains a sequence of one or more frames with each frame containing one or more layers. The sequence of frames in a movie clip may be played to the user in the same manner that a conventional film strip contains individual frames. Each frame may contain an audio component and a graphical component, which may include text or other content capable of being viewed or perceived with a human eye. Each frame may be defined as one or more layers, as if layers of celluloid film were stuck one on top of the other. The layers are combined in a compilation process to produce a frame of the movie clip.

When the author compiles the movie clip, any graphical elements of the layers of a frame from an authoring file and one or more source image files are rendered into a single image, and any streaming audio elements of the layers of the frame from the authoring file and one or more source audio files are compiled into a single audio stream for the frame. The compilation process is repeated for each frame in each movie clip to be compiled into the authoring file to produce a movie file that can be downloaded by the user.

In one embodiment, movie files use a format that can be streamed to the user. This means that as each frame of the movie is downloaded, it may be audibly or graphically rendered to the user when the download of the frame is complete, so that the user does not have to wait for the entire movie file to be downloaded before the movie begins playing. In one embodiment, audio files used in a movie may be designated as streaming or event files. Audio from audio files defined as streaming is downloaded approximately a frame at a time and then may be played to the user without waiting for completion of the downloading of the movie file or all of the audio from the movie file. If the graphics in the movie file are also allowed to stream and thus are rendered before all of the graphics from the movie file have completed downloading, the use of streaming audio allows the audio to be synchronized with the graphics. In contrast, audio files defined as event audio files are played only after the entire event audio source is downloaded to the user. Event files may be downloaded as part of a movie file, or as a separate file but referenced by the media file.

Although the invention is described in the framework of a movie containing movie clips arranged using layers, the present invention applies to any type of media file containing audio.

In one embodiment, an author compiles media files from an authoring file and one or more source files. The definition of the authoring file, storage of the source files and compilation of these files into a media file is performed via system 200. The author controls system 200 and provides source material via communication interface 210. Communication interface 210 is a conventional communication interface which communicates via input/output 208 with a conventional keyboard, mouse, printer, display, diskette drive, sound card source input and output or other similar device of a conventional computer system (not shown) or any other input source such as a local area network (not shown). In one embodiment, all communication into or out of system 200 is made via input/output 208 of communication interface 210.

In one embodiment, an author may supply source material to be used as components of a movie. The source material may be audio source material or graphical source material. In one embodiment, an author supplies source material in the form of conventional computer files to program/graphics storage 222, common format file storage 220 or compressed file storage 218 via communication interface 210. Program/graphics storage 222 holds images, such as files in the conventional JPEG or GIF file formats. Common format file storage 220 holds audio files in a common format such as the conventional WAV audio file format. A common format is a format that allows audio files to be combined without prior conversion into a different format. In one embodiment, common files are those files that are not compressed. Compressed file storage 218 holds audio files in a compressed format that cannot be combined with other audio files without first decompressing them. In one embodiment, compressed file storage holds audio files compressed using the MP3 format, although other embodiments may use other compression algorithms. MP3 compression is described in U.S. Pat. No. 5,579,430, entitled "Digital Encoding Process", issued Nov. 26, 1996, and in U.S. Pat. No. 5,742,735, entitled "Digital Adaptive Transformation Coding Method", issued Apr. 21, 1998, incorporated by reference herein in their entirety, although other descriptions of the conventional MP3 file format may be used.

In addition to supplying graphics and audio sources, an author supplies an authoring file containing instructions describing how the sources are to be rendered and combined to form a movie. In one embodiment, the author provides in the authoring file instructions regarding which movie clips are to be displayed, instructions describing how the movie clips are to be displayed, and instructions defining each layer of each frame of each of the movie clips.

For example, the program could contain instructions that a first graphics file stored in program/graphics storage 222 as described above containing an image of a dog is to be displayed in the upper left hand corner of the first frame on layer one at a size one quarter of the size of the window into which the movie clip will be rendered, and a second image stored in program/graphics storage 222 containing the image of a cat is to be displayed on layer two at a size ⅙ of the window into which the movie clip will be rendered and that in each of the next ten subsequent frames, each of the two graphics files is to be rendered at the same size, but eight pixels to the right of its position in the prior frame so that when the frames are rendered to the user, the two images appear to be moving to the right to show the cat running away and the dog chasing it. These ten frames may be defined as a "chase" movie clip. Another movie clip called the climb movie clip shows the dog sitting and barking at the cat, and the cat climbing and then standing on an invisible tree, with the frames arranged so that the cat is climbing the invisible tree in frames one through six and standing on the invisible tree in frames seven through eight. The two clips may be arranged as children of a main movie clip, with the chase movie clip at frames 1-10 and the climb movie clip at frames 11-18, all on layers one and two, respectively, of the main movie clip. The program may indicate that an image of a tree stored in program/graphics storage 222 may appear on a third layer of the main movie clip, starting at frame 8 and positioned to appear as if the tree is entering the window of the movie clip from the right, moving to the left in frames 7-10 until it is in the center of the window and remaining in the center of the window from frames 11-18.

When the graphics portion of the authoring file and graphics sources are complied as described below, the dog and cat from the two movie clips will be superimposed onto the tree so that the dog and cat appear to be running until they reach the tree, at which point the cat climbs the tree.

On layer four of the main movie clip, the program may contain an instruction that a streaming audio file stored in compressed file storage 218 of a dog barking is to be played from frames 1-18 of the main movie clip, and on layer five of the main movie clip, a streaming audio file stored in common format file storage 220 of a cat howling is to be played from frames 1-12 of the main movie clip.

During compilation of the main movie clip, the dog barking and cat howling will be combined during frames 1-12 and stored in each frame as a single sound, and during frames 13-18, the dog barking audio file is played to the user by itself in each of those frames.

The author may provide instructions to system 200 using program/graphics receiver 216. The instructions describe how a movie will appear and sound, using the source images and source audio material stored in compressed file storage 218, common format file storage 220 and program/graphics storage 222. In one embodiment, one instruction received by program/graphics receiver is the number of frames to be played per unit of time, such as 12 frames per second. Program/graphics receiver 216 can receive the instructions that make up the program file either by receiving individual instructions in text form or by receiving indications of the program using a graphical user interface, which program/graphics receiver 216 uses to build the sequence of instructions in text or object form. In one embodiment, an author may identify to program/graphics receiver 216 an authoring file of instructions the author previously stored in program/graphics storage 222 using communication interface 210, which may then be edited as described above and stored as an authoring file. In one embodiment, program/graphics receiver includes portions of the conventional Flash 5 authoring program described by Ulrich, "Flash 5 for Windows and Macintosh" (2001, Peachpit Press, Berkeley, Calif., ISBN 0-201-71614-3) which is hereby incorporated by reference in its entirety.

In one embodiment, the authoring file contains references to any number of graphics files stored in program/graphics storage 222, any number of audio files stored in compressed file storage 218 or common format file storage 220 or any of these. These references may be stored as part of the authoring file in program/graphics receiver 216.

In one embodiment, when an author identifies a source audio file to program/graphics receiver 216 or at another time, the author designates to program/graphics receiver 216 via communication interface 210 whether each audio file is an event file or a streaming file, although one or the other of these may be used as a default if the author does not provide a designation. If the audio files are designated as streaming as described in more detail below, as each frame of the graphics and the audio is downloaded, it may be immediately played to the user, although in one embodiment, a certain number of frames are downloaded into a buffer before they are played to ensure that the next frame is available when a prior frame has completed playing. Event audio files do not stream: the entire file is received before any portion of it is played back to the user. Program/graphics receiver 216 stores the designation as part of the authoring file in program/graphics storage.

In one embodiment, when the author wishes to make an authoring file available for rendering, for example by the conventional Flash Player commercially available from Macromedia, Inc. of San Francisco, Calif., the author identifies an authoring file stored in program/graphics storage 222 and commands program/graphics receiver 216 via communication interface 210 to compile the authoring file into a media file such as a .swf movie file. As described in more detail below, for each frame of each movie clip in the authoring file, system 200 selects the frame of the movie clip, and combines all layers of graphics into a single graphics frame according to the instructions in the program. Using the example above, each of the first "dog" layer, the second "cat" layer, and the third "tree" layer are combined into one graphic image per frame as described above.

As described in more detail below, system 200 also combines all layers of audio in the selected frame according to the instructions in the program, but system 200 does this only approximately frame by frame, as the frame size of the graphics may not exactly match the frame size of the audio. Again using the above example, the dog bark and cat howl sounds are combined and added together to produce a single audio source for frames 1-12 to be added to the graphic data for each of frames 1-12, and the dog barking audio source is used to produce the audio for frames 13-18. The combination and production of the frame occurs on a frame by frame basis for each movie clip, as will now be described.

To begin the compilation process, program/graphics receiver 216 passes the authoring program or a pointer to the authoring program to clip selector 250, which selects a movie clip specified in the authoring program. Clip selector 250 passes an identifier of the selected clip and a pointer to the program it received from program/graphics receiver 216 to frame selector 224. Frame selector 224 selects the first frame from the selected clip and passes the selected frame, or a copy of, or pointer to, the frame, to both graphics adder 226 and audio detector 228.

In one embodiment, the authoring file contains instructions regarding how and when to render each clip. These instructions or compiled versions of these instructions are retrieved from the authoring file, optionally compiled and stored in the compiled movie file by clip selector 250 each time it selects a clip as described above.

Graphics adder 226 receives the selected frame (or copy or pointer) from frame selector 224 and examines each of the layers of the selected frame in turn, looking for graphics information. The graphics information in each layer of each frame contains pointers to graphics source material stored in program/graphics storage 222 and instructions regarding how the graphics source material is to be rendered. If graphics adder 226 finds such graphics information, graphics adder 226 combines the graphics information from all layers that contain graphics information using the graphics source material specified in the frame and instructions from the frame and renders a single image using conventional rendering techniques. Graphics adder 226 passes this single image to frame writer 244. If no graphics information is found on any layer, graphics adder 226 so indicates to frame writer 244.

Audio detector 228 receives the selected frame from frame selector 224 and examines each layer of the selected frame for audio. If audio detector 228 finds audio in any layers of the selected frame, audio detector 228 provides the frame to source selector 230 and reports the number and type of audio files that audio detector 228 found. If audio detector 228 does not find any audio, then audio detector 228 so indicates to frame writer 244.

Source selector 230 receives the frame and the number and type of audio sources passed by audio detector 228. In one embodiment, audio information for a frame contains one or more references to source audio stored in compressed file storage 218 or common format audio storage 220 or both to be rendered as part of the frame and instructions describing how the source audio is to be rendered. Source selector 230 selects an audio source from the sources referenced in the frame. Source selector 230 identifies the filename corresponding to the selected source, the type of the selected source (e.g. compressed or common format) and whether the source was identified as streaming or an event using information about the selected source provided by the author using program/graphics receiver 216, which stores the information in all frames in which the file is referenced or the stores the information in another portion of the program file (in which case the pointer to the program file is passed to source selector 230 from frame selector 224 via audio detector 228). In one embodiment, program/graphics receiver 216 infers whether the source is stored in a common format or stored in a compressed format using the file extension of the filename of the source when the author adds it to a layer. If the author had designated the source as an event, source selector 230 passes an identifier of the source to event manager 232, described in more detail below. If the author had designated the source as streaming, source selector 230 then passes the type of file and number of audio sources in the frame to conversion identifier 236.

Conversion identifier 236 receives the file name and type of the selected source and the number of audio sources in the layers of the selected frame from source selector 230, and determines whether a conversion of the file format of the selected source is warranted. In one embodiment, conversion identifier 236 determines that a conversion is warranted if the selected source is a compressed file and there is more than one audio source in the layers of the frame. In another embodiment, all sources stored as compressed files are converted into common format files and so conversion identifier is not used: source selector 230 determines whether a conversion is warranted using the type of the source (common format or compressed). Conversion identifier 236 provides the determination it makes to source selector 230.

Source selector 230 passes to portion selector 234 any or all of: the name of the file corresponding to the source selected, the type of the file, the number of audio sources in the frame, and the determination of whether a conversion is warranted.

In one embodiment, in response to the information received from source selector 230, portion selector 234 retrieves a portion of the audio source having the name it receives. The portion selected will, when played, have a duration at least the amount of time that the images in the frame will be displayed by the player, less any excess from the prior frame as will now be described.

In one embodiment, audio files in which any audio sources are stored contain discrete samples, each to be played for a fixed period of time. Compressed files such as MP3 files contain a discrete number of samples per MP3 Frame. If the audio from the MP3 frame or other similar unit will be played during a time spanning two movie frames, in one embodiment, the entire MP3 frame is placed in the second movie frame. If a movie instruction seeks forward to that frame, the frame will contain the samples of the audio that is to be played in that frame and so the player is able to play it. At such time as the player is ready to play the audio from the prior frame, because frames may be buffered, the player is able to take the audio samples to be played at the end of the frame from the next frame.

If a multiple of the amount of data in an MP3 frame will not fit entirely into the amount of time the movie frame is to be played, the last whole frame that will fit is placed into the movie frame and the next MP3 frame is placed into the next frame. Portion selector 234 identifies the amount of audio that can be placed into the largest whole number of MP3 frames that will finish playing before the end of the time of display of the frame. In one embodiment, portion selector 234 calculates this amount by adding the number of samples to be stored in the current frame that will be played in the prior frame to the number of samples that can be played during the frame time defined by the author, dividing by the number of samples per frame and then rounding down to the nearest whole number. Portion selector 234 then calculates how much time remains and calculates how many samples of the audio source for the current movie frame that it may be placing in the next movie frame and internally stores this number for use when it retrieves the sources for the next frame. Portion selector 234 passes the filename of the source and the number of MP3 frames it identifies for the current frame to common format file receiver 214 or compressed file receiver 212 based on the type of the file it received from source selector 224 (with common format file receiver 214 being used for sources stored as common format files and compressed file receiver 212 being used for sources stored as compressed files), and common format file receiver 214 or compressed file receiver 212 retrieves the samples corresponding to the indicated number of MP3 frames from the source. Compressed file receiver 212 may decompress a copy of each portion as it reads it to identify the number of samples in the file, but retains the original portion in its compressed form. The samples retrieved by common format file receiver 214 or compressed file receiver 212 are passed to portion selector 234.

If instructed by source selector 230 that a conversion of the file is warranted, portion selector 234 passes the portion of the file it receives to converter 238, and an indication of the type of the file.

Converter 238 receives the selected portion of audio, the format of the selected portion, and converts the selected portion to the other format. In one embodiment, converter 238 may convert compressed format files from MP3 format to WAV format. In one embodiment, converter 238 may convert common format files from WAV format to MP3 format. In one embodiment, converter 238 includes the conventional Fraunhofer Gesellschaft zur Forderung der Angewandten Forschung e.V. MP3 software routines available under license from Thompson Consumer Electronic Sales GmbH of Hannover, Germany or another similar product that can convert from MP3 to WAV and from WAV to MP3.

Converter 238 returns the converted portion of audio to portion selector 234. In one embodiment, instructions in the file describe how the audio source is to be altered before storage into the compiled movie file, and portion selector 234 receives these instructions from source selector 230, which retrieves them from the file when the source is selected. Portion selector 234 makes the alteration according to the instructions either before or after any conversion is performed.

In one embodiment, portion selector 234 provides the converted portion, if such a conversion was performed, or the original portion, altered according to any instructions as described above, and the number of sources in the frame, to frame writer 244 if source selector 230 indicated that only one audio source was specified for all the layers of the frame, and portion selector 234 signals frame selector 224 to select the next frame, if any, in the movie clip. Otherwise, portion selector 234 passes the number of audio sources in the frame and the converted or original (if not converted) portion of the source to mixer 240.

In the embodiment in which compressed files are first converted to common format files even if only one audio source is specified, portion selector 236 has the portion of such source converted to common format by converter 238 if the source is compressed and always provides the common format version of the portion of the source to mixer 240, which will now be described. Portion selector 236 also passes the number of sources in the frame to mixer 240.

Mixer 240 receives portions of audio files in common format from portion selector 236, one at a time. Mixer 240 internally stores these portions of audio files and combines these portions to produce a single, mixed portion by averaging the sample values from all of the portions for the movie frame. Mixer 240 counts the portions of files it receives for the frame and when the number of portions equals the number of audio sources provided by portion selector 236, it combines them and provides the combined portion to converter 238, requests converter 238 to convert the combined portion from common format to compressed format, and signals frame selector 224 to select the next frame; otherwise, mixer 240 signals source selector 230 to select the next source in the layers of the frame, and the process described above repeats for that source.

When signaled by mixer 240, converter 238 converts the combined portion into compressed format and passes the result to mixer 240, which provides the compressed result and the number of sources in the movie frame to frame writer 244.

Frame writer 244 receives either graphics, audio or both as described above and writes the frame into a .swf or other similar file in compiled frame storage 246. In one embodiment, graphics are written in a separate part of the frame from the audio.

In one embodiment, frame writer 244 writes the audio in each frame as a two field header and an audio field containing zero or more samples. In such embodiment, the header may include two signed, 16-bit fields, the first field indicating how many samples exist in this frame, or zero. When the first field is greater than zero, the second field indicates the number of samples that must be skipped over to locate within the frame the audio for the frame, the remainder being excess from the prior frame. Frame writer 244 identifies the number of samples of audio to be placed in the movie frame (including any frame containing audio to be played in the prior frame) and writes the result as the first field, then writes the number of samples in the first MP3 frame that will be played in the prior movie frame as the second field and computes and stores the number of samples of audio to be played during the current frame that will be written into the next frame for use in performing its calculations for the next frame. Frame writer 244 writes the audio being placed in the movie frame as the remainder of the audio field. Frame writer 244 internally stores the excess for use in the next frame.

In one embodiment, silence of more than a few frames, such as three or ten frames, may be compressed, as will now be described. In such embodiment, before frame writer 244 writes the frame, frame writer 244 sends the audio portion of the frame and the number of sources in the frame to silence manager 242, including the headers, and the entire audio portion, including any excess from the prior frame. If the number of sources for the current frame is zero, silence manager 242 increments an internally stored counter. If there are more than zero audio sources in the movie frame, silence manager resets the counter to zero. If the counter is less than a threshold number between two and ten, such as three or ten, silence manager 242 passes the audio portion of the frame to frame writer 244, which writes the frame as described above.

If the counter is greater than the threshold described above, silence manager 242 removes the whole frames of audio to be played entirely during the time the frame is to be displayed (e.g. it does not remove the first frame if that frame contains samples to be played during the prior frame, even though those samples will be silence) from the audio portion and adjusts the header fields as follows. If the entire audio portion of the frame is silence, both header fields are set to zero. If less than the entire frame is silence, silence manager 242 places a zero in the first header field and a negative number in the second header field, the negative number having an absolute value equal to the number of samples of silence it removes. Silence manager 242 returns the audio portion of the frame (e.g. the headers and the audio) to frame writer 244, which writes the frame using the altered audio portion of the frame.

When signaled as described above, frame selector 224 identifies whether another frame exists in the selected movie clip using the program in program/graphics storage 222 and if so, selects it and repeats the process for a frame described above using the newly-selected frame. In one embodiment, receivers 212-214 maintains their positions in the audio source files so that when they retrieve another portion, it is the portion immediately following the portion retrieved from that source. In one embodiment, audio source files are treated as circular by retrievers 212-214 so that when the end of the file is reached, they retrieve from the beginning of the source file if the author defined the source as a "looping" source using program/graphics receiver 216. In such embodiment, source selector 230 will determine from the instructions in the movie file that the source is a looping source and will inform file receivers 212, 214 via portion selector 234.

If no frames remain in the selected movie clip, frame selector 244 signals clip selector 250 to select the next clip. If another clip is defined in the authoring file in program/graphics storage 222, clip selector 250 selects the clip and repeats the clip compilation process described above. If no more clips remain, clip selector 250 signals frame writer 244 to close the file. If necessary, frame writer 244 writes an additional frame containing excess from the prior frame, and then closes the file.

If a source is passed to event manager 232 as described above, event manager 232 stores the audio source into compiled file storage 246. In one embodiment the event file is stored in compiled file storage 246 as a file separate from the complied movie file, and in another embodiment, the event file is stored in complied file storage 246 as part of the compiled movie file. In one embodiment, if the file is not a compressed format file, event manager 232 calls converter 238 to convert the file from common format to compressed format, and receives and stores the compressed result in compiled file storage 246. In one embodiment, event manager stores one or more instructions into the compiled movie file indicating that the audio from the event source is to be started and including an identifier of the audio as stored in compiled file storage 246.

Figure 3A:
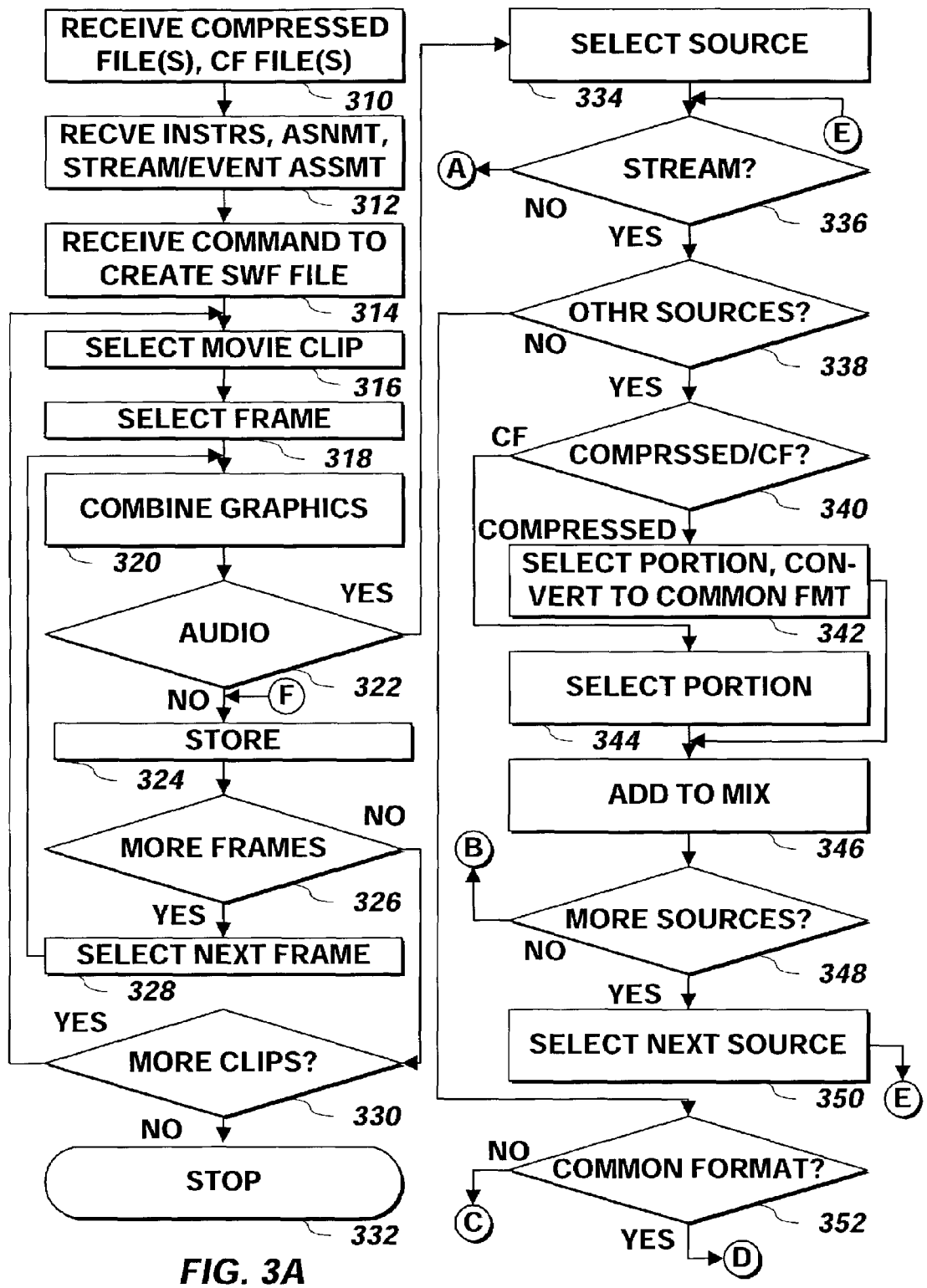
FIG. 3, illustrated in FIGS. 3A, 3B, and 3C, is a flowchart illustrating a method of providing audio to a media file according to one embodiment of the present invention.
Figures 3B, 3C:
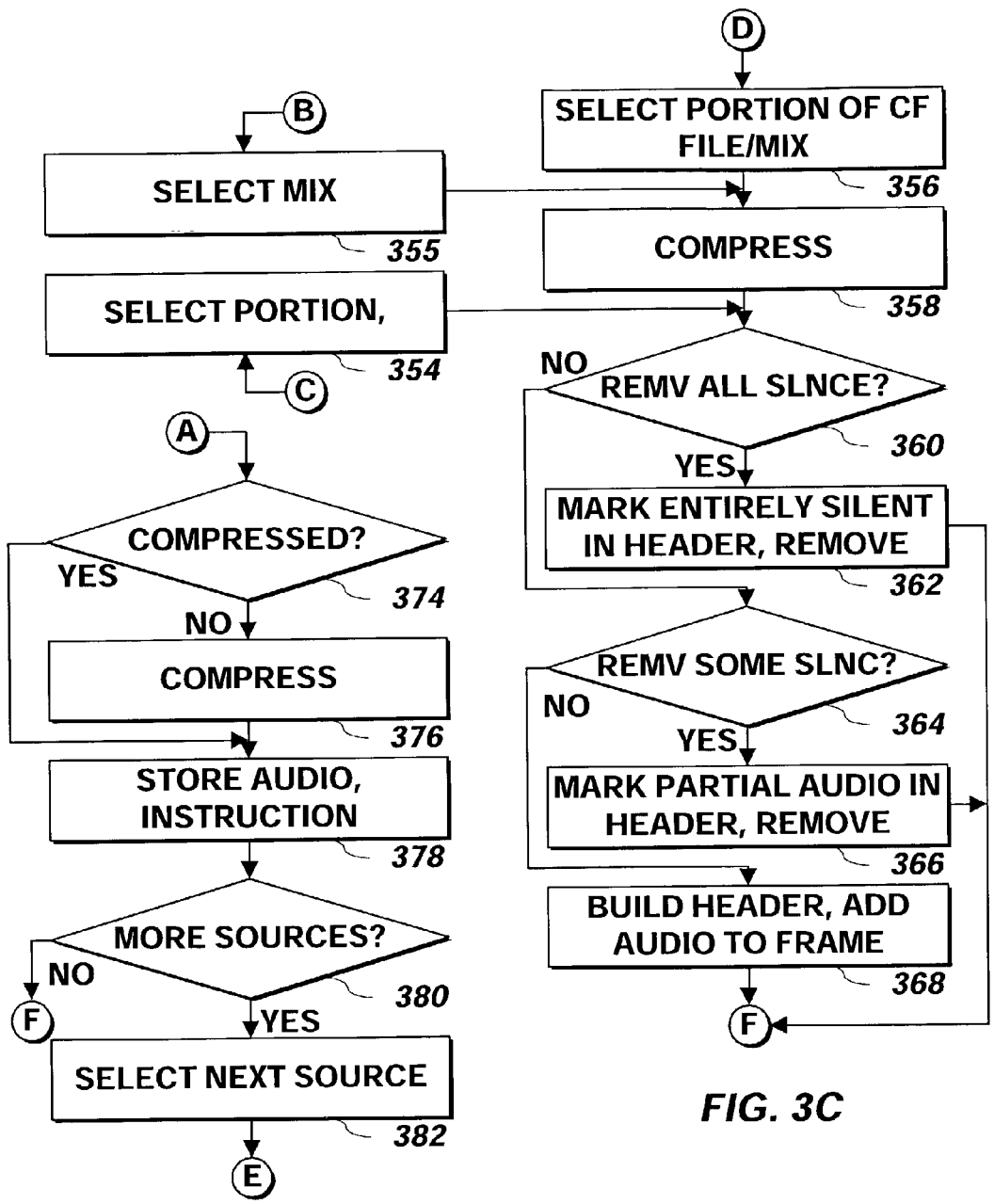

Referring now to FIG. 3, a method of providing audio to a media file is shown according to one embodiment of the present invention. FIG. 3 is illustrated in FIGS. 3A, 3B, and 3C. Graphics files, compressed audio files and/or common format audio files are received 310 as described above, and instructions are received and identification of the type of audio files and a designation as to whether an audio file is an event file or a streaming file are optionally received 312 as described above. A command to compile a movie program is received 314 as described above.

A clip from the movie is selected 316 using an order specified or indicated by the instructions received in step 312, and a frame from that selected clip is selected 318 as described above in the order the frames appear in the clip. Graphics from the selected frame are combined 320 as described above. In one embodiment, it isn't necessary that graphics appear in every frame of a media file and so in such embodiment, step 320 is skipped following a check to determine whether graphics appear in the selected frame. If the frame does not contain an audio signal 322, then any graphics from the frame combined in step 320 along with any audio from the frame are stored 324 into the compiled movie file as described above and the method continues at step 326, and otherwise, the method continues at step 334. At step 326, if there are more frames to process, the next frame from the selected clip is selected 328 as described above and the method continues at step 320. If there are no more frames in the selected clip 326, then the instructions are checked to see if there are more clips in the movie. If there are more clips in the movie 330, the method continues at step 316. If there are no more clips in the movie 330 then the compilation ends.

At step 334, an audio source of the selected frame is selected as described above 334. If the source is not indicated as streaming 336 then the method continues at step 374, and otherwise 336 a check is made 338 for other sources as described above. If there are no other sources 338, then the method continues at step 352. If there are other sources 338, then the selected source is checked to see if it is compressed 340, as described above. If the source is not compressed, then the method continues at step 344. If the source is compressed then a portion corresponding to the selected frame is selected and converted 342 to common format as described above, and the method continues at step 346.

At step 344, a portion corresponding to the selected frame of the source is selected as described above 344, and the portion is combined 346 with any other sources specified for the selected frame as described above. If there are no more sources for the frame as described above 348, the combined portions of the sources of the frame are selected 355 and compressed 358, and the method continues at step 360. If there are more sources for the frame 348, then the next source is selected 350 as described above and the method continues at step 336.

At step 352, if the selected source is not in common format as described above, a portion is selected 356 and compressed 358 as described above and the method continues at step 360 and otherwise 352, a portion of the source corresponding to the selected frame is selected 354 and the method continues at step 360.

At step 360, an audio portion of the frame is built using the two headers and the audio including excess from a prior frame as described above. A check is made 362 to determine if a portion, or the entire frame can be compressed, as described above. If the frame is all silence 364, then the frame header is adjusted 366 to both fields equal to zero to indicate this fact as described above and the audio is removed from the audio portion of the frame and the method continues at step 324, and otherwise, the method continues at step 368. At step 368, if the frame contains part compressible silence as described above, the compressible silence is removed and the frame header is altered as described above 370 and the method continues at step 324 and otherwise, the method continues at step 324.

At step 374, the portion is checked to see if it is compressed as described above 374. If not, the portion is compressed 376 as described above, and in either case the portion is then stored and an instruction to begin playing the event audio file is written into the frame 378. If there are any more sources in the frame 380, the next source is selected 382 as described above and the method continues at step 336, otherwise the method continues at step 324.

What is claimed is:

1. A computer-implemented method comprising:
   identifying a first audio clip and a second audio clip, wherein the first audio clip and the second audio clip are associated with a graphics frame;
   determining that at least a portion of the first audio clip and at least a portion of the second audio clip are to be played simultaneously with respect to the graphics frame;
   mixing the first audio clip and the second audio clip to generate a combined audio clip; and
   storing the combined audio clip and the graphics frame in a media file.

2. The computer-implemented method of claim 1, further comprising:
   determining that at least one of the first audio clip and the second audio clip comprises a compressed audio clip; and
   converting each compressed audio clip to a common format prior to mixing the first audio clip and the second audio clip.

3. The computer-implemented method of claim 1, further comprising:
   extracting the first audio clip from a first audio source file, wherein the extracted first audio clip corresponds temporally to the graphics frame.

4. The computer-implemented method of claim 3, wherein the first audio source file comprises a streaming file.

5. The computer-implemented method of claim 1, further comprising compressing the combined audio clip.

6. The computer-implemented method of claim 1, wherein the media file is stored in a streaming format on a streaming media server.

7. The computer-implemented method of claim 1, wherein mixing the first audio clip and the second audio clip further comprises:
   averaging one or more sample values of the first audio clip with one or more corresponding sample values of the second audio clip.

8. The computer-implemented method of claim 1, wherein the combined audio clip comprises a header and an audio data field.

9. The computer-implemented method of claim 8, wherein the header includes a first field indicating a total number of samples included in the combined audio clip and a second field indicating a first audio sample associated with the graphics frame.

10. A computer program product on a computer readable medium for generating a media file, the computer program product comprising instructions operable to cause data processing apparatus to perform operations comprising:
    identifying a first audio clip and a second audio clip, wherein the first audio clip and the second audio clip are associated with a graphics frame;
    determining that at least a portion of the first audio clip and at least a portion of the second audio clip are to be played simultaneously with respect to the graphics frame;
    mixing the first audio clip and the second audio clip to generate a combined audio clip; and
    storing the combined audio clip and the graphics frame in a media file.

11. The computer program product of claim 10, further comprising:
    determining that at least one of the first audio clip and the second audio clip comprises a compressed audio clip; and
    converting each compressed audio clip to a common format prior to mixing the first audio clip and the second audio clip.

12. The computer program product of claim 10, further comprising:
    extracting the first audio clip from a first audio source file, wherein the extracted first audio clip corresponds temporally to the graphics frame.

13. The computer program product of claim 12, wherein the first audio source file comprises a streaming file.

14. The computer program product of claim 10, further comprising compressing the combined audio clip.

15. The computer program product of claim 10, wherein the media file is stored in a streaming format on a streaming media server.

16. The computer program product of claim 10, wherein mixing the first audio clip and the second audio clip further comprises:
    averaging one or more sample values of the first audio clip with one or more corresponding sample values of the second audio clip.

17. The computer program product of claim 10, wherein the combined audio clip comprises a header and an audio data field.

18. The computer program product of claim 17, wherein the header includes a first field indicating a total number of samples included in the combined audio clip and a second field indicating a first audio sample associated with the graphics frame.

19. A system comprising:
    a storage device configured to store a plurality of files; and
    processor electronics configured to perform operations comprising:
    identifying a first audio clip and a second audio clip, wherein the first audio clip and the second audio clip are associated with a graphics frame;
    determining that at least a portion of the first audio clip and at least a portion of the second audio clip are to be played simultaneously with respect to the graphics frame;
    mixing the first audio clip and the second audio clip to generate a combined audio clip; and
    storing the combined audio clip and the graphics frame in a media file.

20. The system of claim 19, wherein the processor electronics are further configured to perform operations comprising:
    determining that at least one of the first audio clip and the second audio clip comprises a compressed audio clip; and
    converting each compressed audio clip to a common format prior to mixing the first audio clip and the second audio clip.

21. The system of claim 19, wherein the processor electronics are further configured to perform operations comprising:
    extracting the first audio clip from a first audio source file, wherein the extracted first audio clip corresponds temporally to the graphics frame.

22. The system of claim 21, wherein the first audio source file comprises a streaming file.

23. The system of claim 19, wherein the processor electronics are further configured to perform operations comprising compressing the combined audio clip.

24. The system of claim 19, wherein the processor electronics are further configured to perform operations comprising storing the media file in a streaming format on a streaming media server.

25. The system of claim 19, wherein the processor electronics are further configured to perform operations comprising:

mixing the first audio clip and the second audio clip by averaging one or more sample values of the first audio clip with one or more corresponding sample values of the second audio clip.

26. The system of claim 19, wherein the combined audio clip comprises a header and an audio data field.

27. The system of claim 26, wherein the header includes a first field indicating a total number of samples included in the combined audio clip and a second field indicating a first audio sample associated with the graphics frame.

* * * * *

UNITED STATES PATENT AND TRADEMARK OFFICE
CERTIFICATE OF CORRECTION

| | | |
|---|---|---|
| PATENT NO. | : 7,594,218 B1 | Page 1 of 1 |
| APPLICATION NO. | : 10/201056 | |
| DATED | : September 22, 2009 | |
| INVENTOR(S) | : Lozben | |

It is certified that error appears in the above-identified patent and that said Letters Patent is hereby corrected as shown below:

On the Title Page

Item [*] Notice:   Subject to any disclaimer, the term of this patent is extended or adjusted under 35 USC 154(b) by 1518 days.

Delete the phrase "by 1518 days" and insert -- by 2290 days --

Signed and Sealed this

First Day of June, 2010

David J. Kappos
*Director of the United States Patent and Trademark Office*